(12) United States Patent
Zheng

(10) Patent No.: US 12,008,824 B2
(45) Date of Patent: Jun. 11, 2024

(54) TARGET POSITIONING METHOD AND DEVICE, AND UNMANNED AERIAL VEHICLE

(71) Applicant: AUTEL ROBOTICS CO., LTD., Guangdong (CN)

(72) Inventor: Xin Zheng, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 359 days.

(21) Appl. No.: 17/357,346

(22) Filed: Jun. 24, 2021

(65) Prior Publication Data

US 2021/0319575 A1 Oct. 14, 2021

Related U.S. Application Data

(63) Continuation of application No. PCT/CN2019/128057, filed on Dec. 24, 2019.

(30) Foreign Application Priority Data

Dec. 24, 2018 (CN) .......................... 201811581024.5

(51) Int. Cl.
*G06T 7/521* (2017.01)
*B64C 39/02* (2023.01)
(Continued)

(52) U.S. Cl.
CPC .......... *G06V 20/653* (2022.01); *B64C 39/024* (2013.01); *G01S 17/894* (2020.01);
(Continued)

(58) Field of Classification Search
CPC .... G06V 20/653; G06V 20/13; G06V 10/757; G06T 7/521; G06T 7/70;
(Continued)

(56) References Cited

U.S. PATENT DOCUMENTS 11,127,202 B2 * 9/2021 Krishna ............... G06V 10/762
2017/0267334 A1 * 9/2017 Tsai ....................... H04N 7/185
(Continued)

FOREIGN PATENT DOCUMENTS

| CN | 106384353 A | 2/2017 |
| CN | 106932780 A | 7/2017 |

(Continued)

OTHER PUBLICATIONS

International Search Report dated Mar. 13, 2020; PCT/CN2019/128057.

(Continued)

*Primary Examiner* — Shefali D Goradia (57) ABSTRACT

The present invention relates to a target positioning method and device, and an unmanned aerial vehicle. The method includes: acquiring a target image through an image acquisition device; acquiring the position information of a target in the target image according to the target image; acquiring original point clouds of an environment in front of the unmanned aerial vehicle through a depth sensor; acquiring the point clouds corresponding to the target in the original point clouds according to the original point clouds and the position information of the target in the target image; and acquiring the position information of the target in a three-dimensional space according to the point clouds corresponding to the target.

24 Claims, 3 Drawing Sheets

(51) Int. Cl.
*G01S 17/894* (2020.01)
*G06T 7/70* (2017.01)
*G06V 10/75* (2022.01)
*G06V 20/13* (2022.01)
*G06V 20/64* (2022.01)
*B64U 50/00* (2023.01)
*B64U 101/30* (2023.01)

(52) U.S. Cl.
CPC .............. *G06T 7/521* (2017.01); *G06T 7/70* (2017.01); *G06V 10/757* (2022.01); *G06V 20/13* (2022.01); *B64U 50/00* (2023.01); *B64U 2101/30* (2023.01); *G06T 2207/10028* (2013.01)

(58) Field of Classification Search
CPC ......... G06T 2207/10028; G01S 17/894; B64C 39/024; B64U 50/00; B64U 2101/30
See application file for complete search history.

(56) References Cited

U.S. PATENT DOCUMENTS

| | | | |
|---|---|---|---|
| 2017/0314930 A1 | 11/2017 | Monterroza et al. | |
| 2018/0094935 A1* | 4/2018 | O'Brien | G05D 1/102 |
| 2018/0350086 A1* | 12/2018 | Sweet, III | G06T 7/593 |
| 2022/0198793 A1* | 6/2022 | Huang | G06V 20/647 |

FOREIGN PATENT DOCUMENTS

| | | |
|---|---|---|
| CN | 107274447 A | 10/2017 |
| CN | 108229548 A | 6/2018 |
| CN | 108509918 A | 9/2018 |
| CN | 108932475 A | 12/2018 |
| CN | 109767452 A | 5/2019 |

OTHER PUBLICATIONS

The First Chinese Office Action dated Jun. 1, 2020; Appln. No. 201811581024.5.

* cited by examiner

TARGET POSITIONING METHOD AND DEVICE, AND UNMANNED AERIAL VEHICLE

CROSS REFERENCE

This application is a continuation of International Application No. PCT/CN2019/128057, filed on Dec. 24, 2019, which claims priority to Chinese Patent Application No. 2018115810245 filed on Dec. 24, 2018, which is incorporated herein by reference in its entirety.

BACKGROUND

Technical Field

The present invention relates to the technical field of visual tracking, in particular to a target positioning method and device and an unmanned aerial vehicle.

Related Art

Visual tracking algorithms are widely applied to robots or unmanned aerial vehicles, and most of the algorithms are based on two-dimensional images or videos to identify the position of a tracking target in a plane image. The three-dimensional position of the tracking target cannot be intuitively predicted or perceived during tracking, and the three-dimensional space position of the target can be estimated through a fixed target initialization height or plane assumption method and the like in the prior art, so that a spatial motion model is constructed to predict the motion of the target at the next moment. However, the method has defect in robustness and has few applicable scenes, and in path planning, the position accuracy of a three-dimensional target point also directly affects a planning result.

SUMMARY

The technical problem to be solved by the present invention is to provide a target positioning method and device and an unmanned aerial vehicle aiming at the defects in the prior art.

The technical solution adopted by the present invention for solving the technical problem is as follows: provided is a target positioning method, applied to the unmanned aerial vehicle, the unmanned aerial vehicle including an image acquisition device and a depth sensor, and the method including:

acquiring a target image through the image acquisition device;

acquiring the position information of a target in the target image according to the target image;

acquiring original point clouds of an environment in front of the unmanned aerial vehicle through the depth sensor;

acquiring the point clouds corresponding to the target in the original point clouds according to the original point clouds and the position information of the target in the target image; and acquiring the position information of the target in a three-dimensional space according to the point clouds corresponding to the target.

In one of embodiments, the position information of the target in the target image includes minimum bounding box coordinates of the target in the target image, and acquiring the point clouds corresponding to the target in the original point clouds according to the original point clouds and the position information of the target in the target image includes:

projecting the original point clouds to a plane where the target image is located to acquire the coordinates of the original point clouds in the plane where the target image is located; and determining the original point clouds of which the coordinates fall into a minimum bounding box in the original point clouds as the point clouds corresponding to the target.

In one of the embodiments, projecting the original point clouds to the plane where the target image is located to acquire the coordinates of the original point clouds in the plane where the target image is located includes:

transforming the coordinates of the original point clouds in a depth sensor coordinate system into the coordinates of the original point clouds in an image acquisition device coordinate system; and projecting the coordinates of the original point clouds in the image acquisition device coordinate system to the plane where the target image is located to acquire the coordinates of the original point clouds in the plane where the target image is located.

In one of the embodiments, the coordinates of the original point clouds in the image acquisition device coordinate system satisfy:

$$\begin{pmatrix} x' \\ y' \\ z' \end{pmatrix} = T \times \begin{pmatrix} x \\ y \\ z \end{pmatrix},$$

wherein (x', y', z') are the coordinates of the original point clouds in the image acquisition device coordinate system, (x, y, z) are the coordinates of the original point clouds in the depth sensor coordinate system, and T is a transformation matrix from the depth sensor coordinate system to the image acquisition device coordinate system.

In one of the embodiments, the transformation matrix T from the depth sensor coordinate system to the image acquisition device coordinate system satisfies:

$$T = T_2^T \times T_1,$$

wherein $T_1$ is a transformation matrix from the depth sensor coordinate system to an unmanned aerial vehicle fuselage coordinate system, and $T_2$ is a transformation matrix from the image acquisition device coordinate system to the unmanned aerial vehicle fuselage coordinate system.

In one of the embodiments, the coordinates (u, v) of the original point clouds in the plane where the target image is located satisfy:

$$d \times \begin{pmatrix} u \\ v \end{pmatrix} = k \times \begin{pmatrix} x' \\ y' \\ z' \end{pmatrix} \text{ and}$$

$$k = \begin{pmatrix} f_x & 0 & c_x \\ 0 & f_y & c_y \\ 0 & 0 & 1 \end{pmatrix},$$

wherein (x', y', z') are the coordinates of the original point clouds in the image acquisition device coordinate system, d is the depth of the original point clouds, and k is an intrinsic matrix of the image acquisition device.

In one of the embodiments, before acquiring the point clouds corresponding to the target in the original point clouds according to the original point clouds and the position information of the target in the target image, the method further includes:

filtering the original point clouds of which the coordinates fall into the minimum bounding box so as to remove the point clouds which do not belong to the target.

In one of the embodiments, acquiring the position information of the target in the three-dimensional space according to the point clouds corresponding to the target includes:

establishing a three-dimensional map of the environment in front of the unmanned aerial vehicle according to the original point clouds of the environment in front of the unmanned aerial vehicle; and taking an average value of the three-dimensional coordinates of the point clouds corresponding to the target, wherein the average value is configured to represent the position of the target in the three-dimensional map.

In one of the embodiments, the depth sensor includes at least one of:

a binocular camera, a structured light camera, a time of flight (TOF) camera, and a laser radar.

The present invention also provides the target positioning device applied to an unmanned aerial vehicle, the target positioning device including:

an image acquisition module, configured to acquire a target image and acquire the position information of a target in the target image according to the target image;

an original point cloud acquisition module, configured to acquire original point clouds of an environment in front of the unmanned aerial vehicle; and a target position acquisition module, configured to acquire the point clouds corresponding to the target in the original point clouds according to the original point clouds and the position information of the target in the target image; and acquire the position information of the target in a three-dimensional space according to the point clouds corresponding to the target.

In one of the embodiments, the target position acquisition module is further configured to project the original point clouds to a plane where the target image is located to acquire the coordinates of the original point clouds in the plane where the target image is located; and determining the original point clouds of which the coordinates fall into a minimum bounding box in the original point clouds as the point clouds corresponding to the target.

In one of the embodiments, the target position acquisition module is further configured to transform the coordinates of the original point clouds in an original point cloud acquisition module coordinate system into the coordinates of the original point clouds in an image acquisition module coordinate system; and project the coordinates of the original point clouds in the image acquisition module coordinate system to the plane where the target image is located to acquire the coordinates of the original point clouds in the plane where the target image is located.

In one of the embodiments, the coordinates of the original point clouds in the image acquisition module coordinate system satisfy:

$$\begin{pmatrix} x' \\ y' \\ z' \end{pmatrix} = T \times \begin{pmatrix} x \\ y \\ z \end{pmatrix},$$

wherein (x', y', z') are the coordinates of the original point clouds in the image acquisition module coordinate system, (x, y, z) are the coordinates of the original point clouds in the original point cloud acquisition module coordinate system, and T is a transformation matrix from a depth sensor coordinate system to the image acquisition module coordinate system.

In one of the embodiments, the transformation matrix T from the original point cloud acquisition module coordinate system to the image acquisition module coordinate system satisfies:

$$T = T_2^T \times T_1,$$

wherein $T_1$ is a transformation matrix from the original point cloud acquisition module coordinate system to an unmanned aerial vehicle fuselage coordinate system, and $T_2$ is a transformation matrix from the image acquisition module coordinate system to the unmanned aerial vehicle fuselage coordinate system.

In one of the embodiments, the coordinates (u, v) of the original point clouds in the plane where the target image is located satisfy:

$$d \times \begin{pmatrix} u \\ v \end{pmatrix} = k \times \begin{pmatrix} x' \\ y' \\ z' \end{pmatrix} \text{ and}$$

$$k = \begin{pmatrix} f_x & 0 & c_x \\ 0 & f_y & c_y \\ 0 & 0 & 1 \end{pmatrix},$$

wherein (x', y', z') are the coordinates of the original point clouds in the image acquisition module coordinate system, d is the depth of the original point clouds, and k is an intrinsic matrix of the image acquisition module.

In one of the embodiments, the device further includes a point cloud filtering module, the point cloud filtering module being configured to filter the original point clouds of which the coordinates fall into the minimum bounding box so as to remove the point clouds which do not belong to the target.

In one of the embodiments, the target position acquisition module is further configured to establishing a three-dimensional map of the environment in front of the unmanned aerial vehicle according to the original point clouds of the environment in front of the unmanned aerial vehicle; and take an average value of the three-dimensional coordinates of the point clouds corresponding to the target, wherein the average value is configured to represent the position of the target in the three-dimensional map.

In one of the embodiments, the original point cloud acquisition module is a depth sensor, the depth sensor including at least one of:

a binocular camera, a structured light camera, a time of flight (TOF) camera, and a laser radar.

The present invention also provides an unmanned aerial vehicle, including:

a fuselage;

an arm, connected to the fuselage;

a power unit, arranged on the arm and configured to provide power required by the flight of the unmanned aerial vehicle;

a depth sensor, arranged on the fuselage and configured to acquire original point clouds of an environment in front of the unmanned aerial vehicle;

an image acquisition device, arranged on the fuselage and configured to acquire a target image and acquire the position information of a target in the target image according to the target image; and a visual chip, arranged on the fuselage, both the depth sensor and the image acquisition device being in communication connection with the visual chip, and the visual chip being configured to acquire the point clouds corresponding to the target in the original point clouds according to the original point clouds and the position information of the target in the target image; and acquire the position information of the target in a three-dimensional space according to the point clouds corresponding to the target.

In one of the embodiments, the visual chip is further configured to project the original point clouds to a plane where the target image is located to acquire the coordinates of the original point clouds in the plane where the target image is located; and determining the original point clouds of which the coordinates fall into a minimum bounding box in the original point clouds as the point clouds corresponding to the target.

In one of the embodiments, the visual chip is further configured to transform the coordinates of the original point clouds in a depth sensor coordinate system into the coordinates of the original point clouds in an image acquisition device coordinate system; and project the coordinates of the original point clouds in the image acquisition device coordinate system to the plane where the target image is located to acquire the coordinates of the original point clouds in the plane where the target image is located.

In one of the embodiments, the coordinates of the original point clouds in the image acquisition device coordinate system satisfy:

$$\begin{pmatrix} x' \\ y' \\ z' \end{pmatrix} = T \times \begin{pmatrix} x \\ y \\ z \end{pmatrix},$$

wherein (x', y', z') are the coordinates of the original point clouds in the image acquisition device coordinate system, (x, y, z) are the coordinates of the original point clouds in the depth sensor coordinate system, and T is a transformation matrix from the depth sensor coordinate system to the image acquisition device coordinate system.

In one of the embodiments, the transformation matrix T from the depth sensor coordinate system to the image acquisition device coordinate system satisfies:

$$T = T_2^T \times T_1,$$

wherein $T_1$ is the transformation matrix from the depth sensor coordinate system to a fuselage coordinate system, and $T_2$ is the transformation matrix from the image acquisition device coordinate system to the fuselage coordinate system.

In one of the embodiments, the coordinates (u, v) of the original point clouds in the plane where the target image is located satisfy:

$$d \times \begin{pmatrix} u \\ v \end{pmatrix} = k \times \begin{pmatrix} x' \\ y' \\ z' \end{pmatrix} \text{ and}$$

$$k = \begin{pmatrix} f_x & 0 & c_x \\ 0 & f_y & c_y \\ 0 & 0 & 1 \end{pmatrix},$$

wherein (x', y', z') are the coordinates of the original point clouds in the image acquisition device coordinate system, d is the depth of the original point clouds, and k is an intrinsic matrix of the image acquisition device.

In one of the embodiments, the visual chip is further configured to filter the original point clouds of which the coordinates fall into the minimum bounding box so as to remove the point clouds which do not belong to the target.

In one of the embodiments, the visual chip is further configured to establishing a three-dimensional map of the environment in front of the unmanned aerial vehicle according to the original point clouds of the environment in front of the unmanned aerial vehicle; and take an average value of the three-dimensional coordinates of the point clouds corresponding to the target, wherein the average value is configured to represent the position of the target in the three-dimensional map.

In one of the embodiments, the depth sensor includes at least one of:

a binocular camera, a structured light camera, a time of flight (TOF) camera, and a laser radar.

The target positioning method provided by the present invention has the following beneficial effects that the target image is acquired through the image acquisition device, the position information of the target in the target image is acquired according to the target image, the original point clouds of the environment in front of the unmanned aerial vehicle is acquired through the depth sensor, then the point clouds corresponding to the target in the original point clouds are acquired according to the original point clouds and the position information of the target in the target image, and the position information of the target in the three-dimensional space is acquired according to the acquired point clouds corresponding to the target, so that the real-time position of the target at the current moment is accurately determined according to the acquired position information of the target in the three-dimensional space, the depth information of the target is acquired, a motion estimation model with higher stability and precision can be provided for target tracking, thus the probability of mistaken identification and tracking loss is reduced, and more accurate three-dimensional path planning and the visualization of real-time three-dimensional reconstruction can be achieved. Meanwhile, the three-dimensional map with the target object can be used for obstacle avoidance, and the target is prevented from being mistaken as an obstacle in path planning.

BRIEF DESCRIPTION OF THE DRAWINGS

The present invention is further described below with reference to the accompanying drawings and embodiments. In the accompanying drawings.

DETAILED DESCRIPTION

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative effects shall fall within the protection scope of the present invention.

Figure 1:
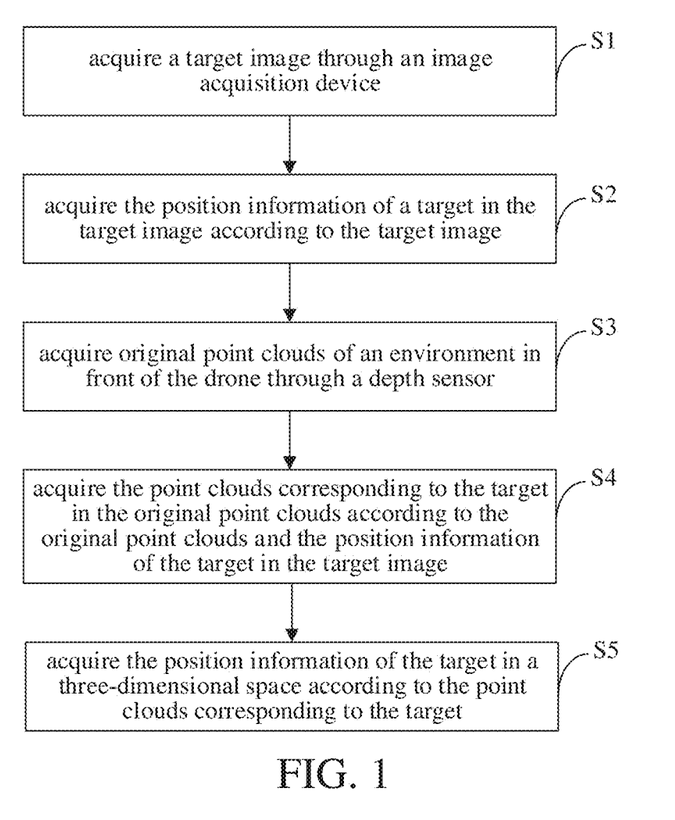
FIG. 1 is a schematic flowchart of a target positioning method according to an embodiment of the present invention.

Referring to FIG. 1, an embodiment of the present invention provides a target positioning method. According to the method, an unmanned aerial vehicle can acquire the position information of a target in a three-dimensional space in real time, a three-dimensional motion model can be constructed according to the acquired position information in the three-dimensional space to predict the motion of the target at the next moment, or three-dimensional reconstruction can be performed according to the acquired position information in the three-dimensional space, a three-dimensional map with the target is established, obstacle avoidance and path planning are carried out by using the three-dimensional map with the target, and the target can be prevented from being mistaken as an obstacle in path planning.

FIG. 1 is a schematic flowchart of a target positioning method according to an embodiment of the present invention.

The target positioning method includes the following steps:

S1: a target image is acquired through an image acquisition device 122.

In the embodiments of the present invention, the image acquisition device 122 may be a color camera that acquires an image of the target in a two-dimensional plane, i.e., the target image acquired by the image acquisition device 122 is a two-dimensional image. The target image may include two-dimensional coordinate information, color information, or the like of the image. In the embodiments of the present invention, the parameters and the position of the adopted color camera are not specifically limited, as long as the calibration parameters of the color camera are known; or the color camera may also be designed as a movable structure to rotate with a target position, i.e., as long as the transformation relation of the color camera with respect to a fuselage 12 of an unmanned aerial vehicle 10 can be obtained.

S2: the position information of the target in the target image is acquired according to the target image.

Figure 2:
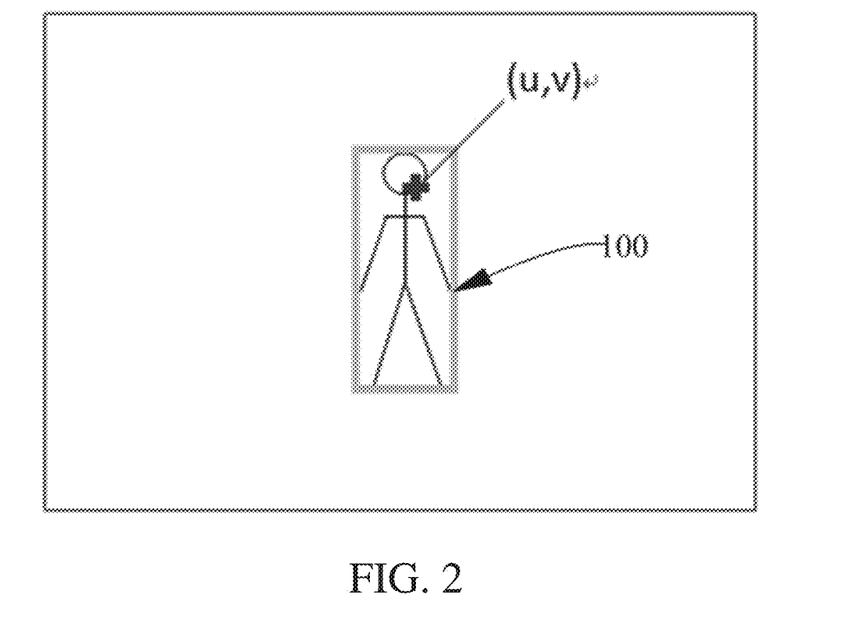
FIG. 2 is a schematic diagram of a minimum bounding box of a target in a target image in an embodiment of the present invention.

Understandably, in the embodiments of the present invention, the position information of the target in the target image may include minimum bounding box coordinates of the target in the target image. A minimum bounding box of the target in the target image is a minimum bounding rectangular area including the target, see 100 in FIG. 2.

S3: original point clouds of an environment in front of the unmanned aerial vehicle 10 is acquired through a depth sensor 121.

In the embodiments of the present invention, the type, number, and position of the depth sensors 121 are not particularly limited, and can be selected and set according to actual following requirements. For example, the depth sensor 121 includes at least one of a binocular camera, a structured light camera, a time of flight (TOF) camera, and a laser radar. In order to ensure that the depth cameras can observe the target object at any moment, multiple groups of depth cameras can be arranged in multiple directions or in all directions; or the depth camera is designed as a movable structure to rotate along with the target position and so on, i.e., as long as the transformation relation of the depth camera with respect to the fuselage 12 can be obtained.

In the embodiment of the present invention, the environment in front of the unmanned aerial vehicle 10 is the environment in a traveling direction of the unmanned aerial vehicle 10.

S4: the point clouds corresponding to the target in the original point clouds is acquired according to the original point clouds and the position information of the target in the target image.

Understandably, the position information of the target in the target image may be the minimum bounding box coordinates of the target in the target image. At the moment, the step S4 specifically may include the following steps:

S41: the original point clouds are projected to a plane where the target image is located to acquire the coordinates of the original point clouds in the plane where the target image is located.

In the embodiment of the present invention, the step S41 specifically may include the following steps:

S411: the coordinates of the original point clouds in a depth sensor 121 coordinate system are transformed into the coordinates of the original point clouds in an image acquisition device 122 coordinate system.

Optionally, in the embodiment of the present invention, the coordinates of the original point clouds in the image acquisition device 122 coordinate system satisfy:

$$\begin{pmatrix} x' \\ y' \\ z' \end{pmatrix} = T \times \begin{pmatrix} x \\ y \\ z \end{pmatrix}, \tag{1}$$

wherein $(x', y', z')$ are the coordinates of the original point clouds in the image acquisition device 122 coordinate system, $(x, y, z)$ are the coordinates of the original point clouds in the depth sensor 121 coordinate system, and T is a transformation matrix from the depth sensor 121 coordinate system to the image acquisition device 122 coordinate system. Through the formula (1), the coordinates $(x', y', z')$ of the original point clouds in the image acquisition device 122 coordinate system can be quickly acquired.

Since the depth sensor 121 and the image acquisition device 122 of the unmanned aerial vehicle 10 tend to rotate during motion, the transformation matrix of the two coordinate systems is often not directly available. In some embodiments, the transformation matrix T from the depth sensor 121 coordinate system to the image acquisition device 122 coordinate system can be derived from the transformation matrix $T_1$ from the depth sensor 121 coordinate system to an unmanned aerial vehicle 10 fuselage 12 coordinate system and the transformation matrix $T_2$ from the image acquisition device 122 coordinate system to the unmanned aerial vehicle 10 fuselage 12 coordinate system.

The transformation matrix T from the depth sensor 121 coordinate system to the image acquisition device 122 coordinate system satisfies:

$$T = T_2^T \times T_1 \quad (2),$$

wherein $T_1$ is the transformation matrix from the depth sensor 121 coordinate system to the unmanned aerial vehicle 10 fuselage 12 coordinate system, and $T_2$ is the transformation matrix from the image acquisition device 122 coordinate system to the unmanned aerial vehicle 10 fuselage 12 coordinate system.

The transformation matrix T from the depth sensor 121 coordinate system to the image acquisition device 122 coordinate system can be rapidly acquired through the formula (2), and then the coordinates (x', y', z') of the original point clouds in the image acquisition device 122 coordinate system can be rapidly calculated through the formula (1).

S412: the coordinates of the original point clouds in the image acquisition device 122 coordinate system are projected to the plane where the target image is located to acquire the coordinates of the original point clouds in the plane where the target image is located.

Optionally, the coordinates (u, v) of the original point clouds in the plane where the target image is located satisfy:

$$d \times \begin{pmatrix} u \\ v \end{pmatrix} = k \times \begin{pmatrix} x' \\ y' \\ z' \end{pmatrix} \text{ and} \quad (3)$$

$$k = \begin{pmatrix} f_x & 0 & c_x \\ 0 & f_y & c_y \\ 0 & 0 & 1 \end{pmatrix}, \quad (4)$$

wherein (x', y', z') are the coordinates of the original point clouds in the image acquisition device 122 coordinate system, d is the depth of the original point clouds, and k is an intrinsic matrix of the image acquisition device 122.

Therefore, after the coordinates (x', y', z') of the original point clouds in the image acquisition device 122 coordinate system are acquired, the coordinates (u, v) of the original point clouds in the plane where the target image is located can be quickly calculated according to the formulas (3) and (4).

S42: the original point clouds of which the coordinates fall into the minimum bounding box are determined in the original point clouds as the point clouds corresponding to the target.

Specifically, after all coordinates of the original point clouds in the plane where the target image is located are acquired through the above-mentioned method, the acquired coordinates of each original point cloud in the plane where the target image is located are compared with the minimum bounding box for judgment and then all original point clouds of which the coordinates fall into the minimum bounding box are determined. The original point clouds of which the coordinates in the plane where the target image is located fall into the minimum bonding box are the point clouds corresponding to the target.

Further, before execution of the step S4, the target positioning method may further include the following step:

filtering the original point clouds of which the coordinates fall into the minimum bounding box so as to remove the point clouds which do not belong to the target.

Optionally, the original point clouds of which the coordinates fall into the minimum bounding box can be filtered by adopting a preset filtering method. The preset filtering method includes but is not limited to a Gaussian filtering method, a radius filtering method, a clustering method, a smoothing method, a connected domain method and the like.

The Gaussian filtering method is used as an example for explanation, the total number of the original point clouds of which the coordinates fall into the minimum bounding box is set to be n, the average distance $d_i$ between the ith original point cloud and m adjacent original point clouds closest to the ith original point cloud is calculated, $d_1$–$d_n$ can form Gaussian distribution, that is, di~(μ, σ), expected μ and variance σ are calculated, and according to the property of Gaussian distribution, under the condition that $d_i$>M*σ, the original point cloud does not belong to the rectangular area and needs to be filtered out. M may be 2.0-3.0, and m is determined according to the resolution of the depth camera and the order of magnitude of the total original point clouds and generally may be a positive integer of 30-50.

In a similar way, the same effect can also be achieved by adopting the radius filtering method, the clustering method, the smoothing method, the connected domain method and the like.

S5: the position information of the target in the three-dimensional space is acquired according to the point clouds corresponding to the target.

Optionally, the step S5 specifically may include the following steps:

S51: a three-dimensional map of the environment in front of the unmanned aerial vehicle 10 is established according to the original point clouds of the environment in front of the unmanned aerial vehicle 10.

Specifically, the original point clouds of the environment in front of the unmanned aerial vehicle 10 and the point clouds corresponding to the target acquired by the depth sensor 121 are transformed into a world coordinate system, and the original point clouds of the environment in front of the unmanned aerial vehicle 10 and the point clouds corresponding to the target acquired by the depth sensor 121 are combined and post-processed in the world coordinate system to acquire the three-dimensional map of the environment in front of the unmanned aerial vehicle 10.

Optionally, after all the original point clouds and the target point clouds acquired by the depth sensor 121 are combined in the world coordinate system, all the point clouds can be further post-processed by the methods of voxel filtering, octree or the like, and finally the three-dimensional map including the target is acquired. The three-dimensional map may be represented by an octree, a voxel, a grid map, a direct point cloud map, or the like, as long as it can represent a three-dimensional spatial relation, and the present invention is not specifically limited thereto. Of course, understandably, in some other embodiments, the map may be reduced in dimensionality to form a two-dimensional map in order to reduce the amount of calculation.

S52, an average value of the three-dimensional coordinates of the point clouds corresponding to the target is calculated, wherein the average value is configured to represent the position of the target in the three-dimensional map.

Figure 3:
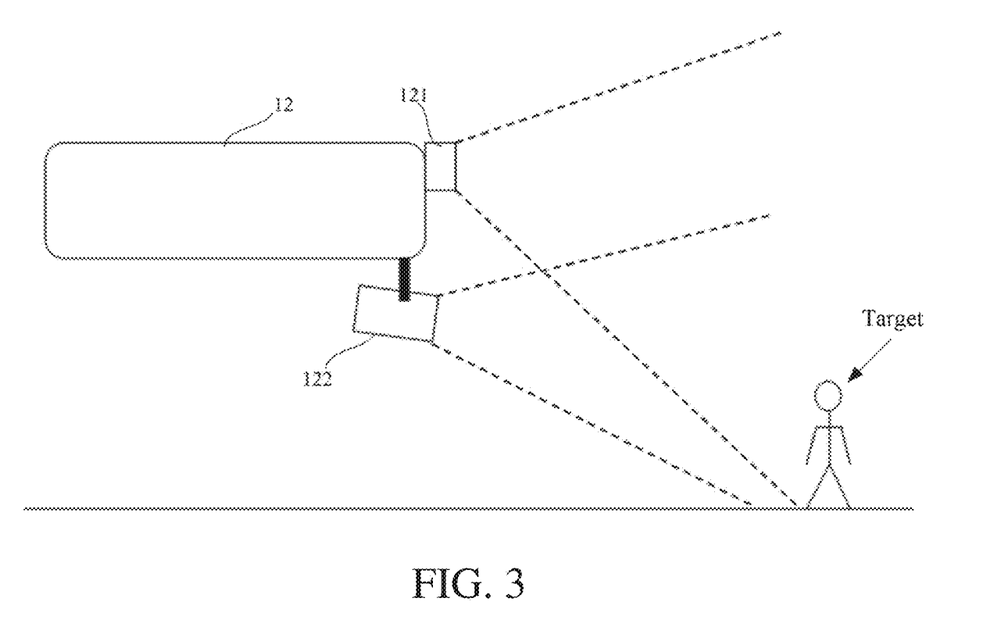
FIG. 3 is a schematic diagram of target positioning in an embodiment of the present invention.

Specifically, in the embodiment of the present invention, the positioning schematic diagram of the target positioning method is shown in FIG. 3. The depth sensor 121 and the image acquisition device 122 are both arranged on the fuselage 12 of the unmanned aerial vehicle 10.

According to the target positioning method provided by the present invention, through the method of integrating data acquired by the depth sensor 121 and the image acquisition device 122 which are arranged on the unmanned aerial vehicle 10, a traditional plane video and image tracking algorithm is kept, meanwhile, the depth of the target is acquired, a motion estimation model with higher stability and higher precision can be provided for target tracking, and the probability of mistaken identification and tracking loss is effectively reduced. Moreover, since the depth of the target cannot be acquired in a two-dimensional color image in target identification, the point clouds of the depth sensor 121 are projected to the image acquisition device 122 coordinate system by utilizing the transformation relation, then all the point clouds are reversely projected to the two-dimensional plane, and the satisfactory point clouds are found out. Herein, the satisfactory point clouds are the original point clouds of which the coordinates fall into the minimum bounding box. For example, all first three-dimensional coordinates (original point clouds) acquired by the depth sensor 121 at a frame are set as $A(x_1, y_1, z_1)$, $B(x_2, y_2, z_2)$, $C(x_3, y_3, z_3)$, $D(x_4, y_4, z_4)$, coordinates in the image acquisition device 122 coordinate system are set as $A(u'_1, v'_1)$, $B(u'_2, v'_2)$, $C(u'_3, v'_3)$, $D(u'_4, v'_4)$, coordinates in the minimum bounding box are set as $A(u'_1, v'_1)$, $C(u'_3, v'_3)$, and thus the satisfactory point clouds are $A(x_1, y_1, z_1)$ and $C(x_3, y_3, z_3)$ corresponding to $A(u'_1, v'_1)$ and $C(u'_3, v'_3)$.

In addition, the size and the position of the target can be accurately marked in the three-dimensional map, and more accurate three-dimensional path planning and visualization of real-time three-dimensional reconstruction are achieved. Meanwhile, the point clouds of a moving target are marked and thus the target can be prevented from being mistaken as an obstacle in path planning.

Figure 4:
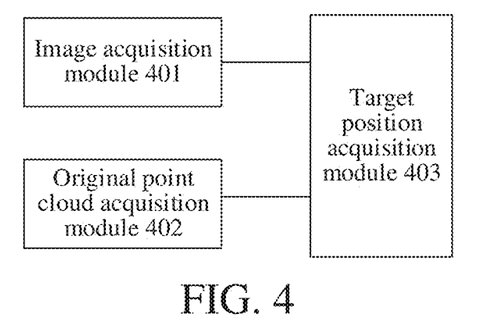
FIG. 4 is a functional block diagram of a target positioning device according to an embodiment of the present invention.

Referring to FIG. 4, the functional block diagram of the target positioning device according to the embodiment of the present invention is provided. The target positioning device can be configured to realize the target positioning method aforementioned.

As shown in FIG. 4, the target positioning device applied to the unmanned aerial vehicle 10 may specifically include an image acquisition module 401, an original point cloud acquisition module 402, and a target position acquisition module 403.

The image acquisition module 401 is configured to acquire a target image and acquire the position information of a target in the target image according to the target image.

In the embodiments of the present invention, the image acquisition device 122 may be a color camera that acquires an image of the target in a two-dimensional plane, i.e., the target image acquired by the image acquisition device 122 is a two-dimensional image. The target image may include two-dimensional coordinate information, color information, or the like of the image. In the embodiments of the present invention, the parameters and the position of the adopted color camera are not specifically limited, as long as the calibration parameters of the color camera are known; or the color camera may also be designed as a movable structure to rotate with a target position, i.e., as long as the transformation relation of the color camera with respect to a fuselage 12 of an unmanned aerial vehicle 10 can be obtained.

Understandably, in the embodiments of the present invention, the position information of the target in the target image may include minimum bounding box coordinates of the target in the target image. A minimum bounding box of the target in the target image is a minimum bounding rectangular area including the target, see 100 in FIG. 2.

The original point cloud acquisition module 402 is configured to acquire original point clouds of an environment in front of the unmanned aerial vehicle 10.

Optionally, the original point cloud acquisition module 402 of the embodiment of the present invention may include a depth sensor 121 and the original point clouds of the environment in front of the unmanned aerial vehicle 10 may can acquired through the depth sensor 121. The embodiment of the present invention is not particularly limited to the type, number, and position of the depth sensors 121, and can be selected and set according to actual follow-up requirements. For example, the depth sensor 121 includes at least one of a binocular camera, a structured light camera, a time of flight (TOF) camera, and a laser radar. In order to ensure that the depth cameras can observe the target object at any moment, multiple groups of depth cameras can be arranged in multiple directions or in all directions; or the depth camera is designed as a movable structure to rotate along with the target position and so on, i.e., as long as the transformation relation of the depth camera with respect to the fuselage 12 can be obtained.

In the embodiment of the present invention, the environment in front of the unmanned aerial vehicle 10 is the environment in a traveling direction of the unmanned aerial vehicle 10.

The target position acquisition module 403 is configured to
acquire the point clouds corresponding to the target in the original point clouds according to the original point clouds and the position information of the target in the target image; and
acquire the position information of the target in a three-dimensional space according to the point clouds corresponding to the target.

In the embodiment of the present invention, the position information of the target in the target image may be the minimum bounding box coordinates of the target in the target image. At the moment, the target position acquisition module 403 is further configured to project the original point clouds to a plane where the target image is located to acquire the coordinates of the original point clouds in the plane where the target image is located.

Specifically, the coordinates of the original point clouds in a depth sensor 121 coordinate system are first transformed into the coordinates of the original point clouds in an image acquisition device 122 coordinate system; and then the coordinates of the original point clouds in the image acquisition device 122 coordinate system are projected to the plane where the target image is located to acquire the coordinates of the original point clouds in the plane where the target image is located.

Optionally, in the embodiment of the present invention, the coordinates of the original point clouds in the image acquisition device 122 coordinate system satisfy:

$$\begin{pmatrix} x' \\ y' \\ z' \end{pmatrix} = T \times \begin{pmatrix} x \\ y \\ z \end{pmatrix}, \quad (1)$$

wherein (x', y', z') are the coordinates of the original point clouds in the image acquisition device 122 coordinate system, (x, y, z) are the coordinates of the original point clouds in the depth sensor 121 coordinate system, and T is a transformation matrix from the depth sensor 121 coordinate system to the image acquisition device 122 coordinate system. Through the formula (1), the coordinates (x', y', z') of the original point clouds in the image acquisition device 122 coordinate system can be quickly acquired.

Since the depth sensor 121 and the image acquisition device 122 of the unmanned aerial vehicle 10 tend to rotate during motion, the transformation matrix of the two coordinate systems is often not directly available. In some embodiments, the transformation matrix T from the depth sensor 121 coordinate system to the image acquisition device 122 coordinate system can be derived from the transformation matrix $T_1$ from the depth sensor 121 coordinate system to an unmanned aerial vehicle 10 fuselage 12 coordinate system and the transformation matrix $T_2$ from the image acquisition device 122 coordinate system to the unmanned aerial vehicle 10 fuselage 12 coordinate system.

The transformation matrix T from the depth sensor 121 coordinate system to the image acquisition device 122 coordinate system satisfies:

$$T = T_2^T \times T_1 \quad (2),$$

wherein $T_1$ is the transformation matrix from the depth sensor 121 coordinate system to the unmanned aerial vehicle 10 fuselage 12 coordinate system, and $T_2$ is the transformation matrix from the image acquisition device 122 coordinate system to the unmanned aerial vehicle 10 fuselage 12 coordinate system.

The transformation matrix T from the depth sensor 121 coordinate system to the image acquisition device 122 coordinate system can be rapidly acquired through the formula (2), and then the coordinates (x', y', z') of the original point clouds in the image acquisition device 122 coordinate system can be rapidly calculated through the formula (1).

Optionally, the coordinates (u, v) of the original point clouds in the plane where the target image is located satisfy:

$$d \times \begin{pmatrix} u \\ v \end{pmatrix} = k \times \begin{pmatrix} x' \\ y' \\ z' \end{pmatrix} \text{ and} \quad (3)$$

$$k = \begin{pmatrix} f_x & 0 & c_x \\ 0 & f_y & c_y \\ 0 & 0 & 1 \end{pmatrix}, \quad (4)$$

wherein (x', y', z') are the coordinates of the original point clouds in the image acquisition device 122 coordinate system, d is the depth of the original point clouds, and k is an intrinsic matrix of the image acquisition device 122.

Therefore, after the coordinates (x', y', z') of the original point clouds in the image acquisition device 122 coordinate system are acquired, the coordinates (u, v) of the original point clouds in the plane where the target image is located can be quickly calculated according to the formulas (3) and (4).

Further, the target position acquisition module 403 is further configured to determine the original point clouds of which the coordinates fall into the minimum bounding box in the original point clouds as the point clouds corresponding to the target.

Specifically, after all coordinates of the original point clouds in the plane where the target image is located are acquired through the above-mentioned method, the acquired coordinates of each original point cloud in the plane where the target image is located are compared with the minimum bounding box for judgment and then all original point clouds of which the coordinates fall into the minimum bounding box are determined. The original point clouds of which the coordinates in the plane where the target image is located fall into the minimum bonding box are the point clouds corresponding to the target.

Further, the target positioning device further includes a point cloud filtering module that is configured to filter the original point clouds of which the coordinates fall into the minimum bounding box so as to remove the point clouds which do not belong to the target.

Optionally, the original point clouds of which the coordinates fall into the minimum bounding box can be filtered by adopting a preset filtering method. The preset filtering method includes but is not limited to a Gaussian filtering method, a radius filtering method, a clustering method, a smoothing method, a connected domain method and the like.

The Gaussian filtering method is used as an example for explanation, the total number of the original point clouds of which the coordinates fall into the minimum bounding box is set to be n, the average distance $d_i$ between the ith original point cloud and m adjacent original point clouds closest to the ith original point cloud is calculated, $d_1$–$d_n$ can form Gaussian distribution, that is, di–($\mu$, $\sigma$), expected $\mu$ and variance $\sigma$ are calculated, and according to the property of Gaussian distribution, under the condition that $d_i > M^*\sigma$, the original point cloud does not belong to the rectangular area and needs to be filtered out. M may be 2.0-3.0, and m is determined according to the resolution of the depth camera and the order of magnitude of the total original point clouds and generally may be a positive integer of 30-50.

In a similar way, the same effect can also be achieved by adopting the radius filtering method, the clustering method, the smoothing method, the connected domain method and the like.

Further, the target position acquisition module 403 of the embodiment of the present invention is further configured to establish a three-dimensional map of the environment in front of the unmanned aerial vehicle 10 according to the original point clouds of the environment in front of the unmanned aerial vehicle 10.

Specifically, the original point clouds of the environment in front of the unmanned aerial vehicle 10 and the point clouds corresponding to the target acquired by the depth sensor 121 are transformed into a world coordinate system, and the original point clouds of the environment in front of the unmanned aerial vehicle 10 and the point clouds corresponding to the target acquired by the depth sensor 121 are combined and post-processed in the world coordinate system to acquire the three-dimensional map of the environment in front of the unmanned aerial vehicle 10.

Optionally, after all the original point clouds and the target point clouds acquired by the depth sensor 121 are combined in the world coordinate system, all the point clouds can be further post-processed by the methods of voxel filtering, octree or the like, and finally the three-dimensional map including the target is acquired. The three-dimensional map may be represented by an octree, a voxel, a grid map, a direct point cloud map, or the like, as long as it can represent a three-dimensional spatial relation, and the present invention is not specifically limited thereto. Of course, understandably, in some other embodiments, the map may be reduced in dimensionality to form a two-dimensional map in order to reduce the amount of calculation.

Further, the target position acquisition module 403 of the embodiment of the present invention is further configured to take an average value of the three-dimensional coordinates of the point clouds corresponding to the target. The average value is configured to represent the position of the target in the three-dimensional map.

In the embodiment of the present invention, the target position acquisition module 403 may be a visual chip 123.

Figure 5:
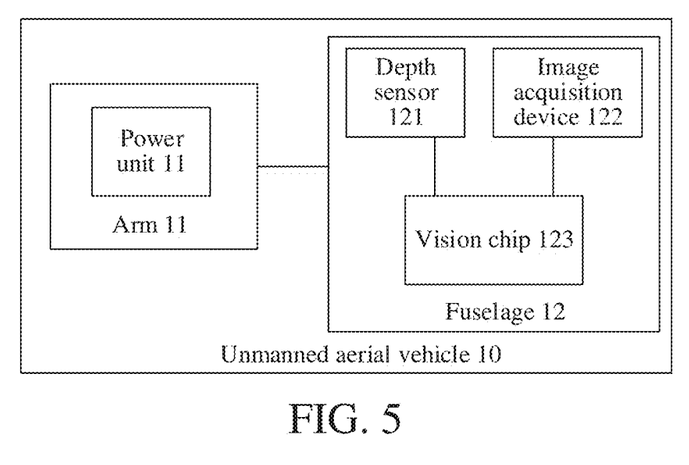
FIG. 5 is a functional block diagram of an unmanned aerial vehicle according to an embodiment of the present invention.

Referring to FIG. 5, a functional block diagram of an unmanned aerial vehicle 10 according to an embodiment of the present invention is provided. Understandably, the unmanned aerial vehicle 10 provided by the embodiment of the present invention may be applied to implementing the aforementioned target positioning method. The unmanned aerial vehicle 10 can accurately determine the real-time position of the target at the current moment, the depth information of the target is acquired, a motion estimation model with higher stability and higher precision can be provided for target tracking, the probability of mistaken identification and tracking loss is reduced, and more accurate three-dimensional path planning and visualization of real-time three-dimensional reconstruction can be achieved. Meanwhile, the three-dimensional map with the target object can be used for obstacle avoidance, and the target can be prevented from being mistaken as an obstacle in path planning.

As shown in FIG. 5, the unmanned aerial vehicle 10 provided by the embodiment of the present invention includes a fuselage 12, an arm 11 connected to the fuselage 12, a power unit 111 arranged on the arm 11, a depth sensor 121 arranged on the fuselage 12, an image acquisition device 122 arranged on the fuselage 12, and a visual chip 123 arranged on the fuselage 12.

In the embodiment of the present invention, the power unit 111 is configured to provide power required by the flight of the unmanned aerial vehicle 10. Optionally, the power unit 111 may include a motor arranged on the arm 11 and a propeller connected to the motor. The motor drives the propeller to rotate at a high speed to provide the power required by the flight of the unmanned aerial vehicle.

In the embodiment of the present invention, the depth sensor 121 is configured to acquire the original point clouds of the environment in front of the unmanned aerial vehicle 10.

Optionally, the original point cloud acquisition module 402 of the embodiment of the present invention may include a depth sensor 121 and the original point clouds of the environment in front of the unmanned aerial vehicle 10 may can acquired through the depth sensor 121. The embodiment of the present invention is not particularly limited to the type, number, and position of the depth sensors 121, and can be selected and set according to actual follow-up requirements. For example, the depth sensor 121 includes at least one of a binocular camera, a structured light camera, a time of flight (TOF) camera, and a laser radar. In order to ensure that the depth cameras can observe the target object at any moment, multiple groups of depth cameras can be arranged in multiple directions or in all directions; or the depth camera is designed as a movable structure to rotate along with the target position and so on, i.e., as long as the transformation relation of the depth camera with respect to the fuselage 12 can be obtained.

In the embodiment of the present invention, the environment in front of the unmanned aerial vehicle 10 is the environment in a traveling direction of the unmanned aerial vehicle 10.

In the embodiment of the present invention, the image acquisition device 122 is configured to acquire a target image, and acquire the position information of the target in the target image.

In the embodiments of the present invention, the image acquisition device 122 may be a color camera that acquires an image of the target in a two-dimensional plane, i.e., the target image acquired by the image acquisition device 122 is a two-dimensional image. The target image may include two-dimensional coordinate information, color information, or the like of the image. In the embodiments of the present invention, the parameters and the position of the adopted color camera are not specifically limited, as long as the calibration parameters of the color camera are known; or the color camera may also be designed as a movable structure to rotate with a target position, i.e., as long as the transformation relation of the color camera with respect to a fuselage 12 of an unmanned aerial vehicle 10 can be obtained.

Understandably, in the embodiments of the present invention, the position information of the target in the target image may include minimum bounding box coordinates of the target in the target image. A minimum bounding box of the target in the target image is a minimum bounding rectangular area including the target, see 100 in FIG. 2.

Optionally, the position information of the target in the target image includes minimum bounding box coordinates of the target in the target image.

In the embodiment of the present invention, the visual chip 123 and the depth sensor 121 are in communication connection with the image acquisition device 122.

Specifically, the visual chip 123 is configured to
acquire the point clouds corresponding to the target in the original point clouds according to the original point clouds and the position information of the target in the target image; and
acquire the position information of the target in a three-dimensional space according to the point clouds corresponding to the target.

In the embodiment of the present invention, the position information of the target in the target image may be the minimum bounding box coordinates of the target in the target image. At the moment, the visual chip 123 is further configured to project the original point clouds to a plane where the target image is located to acquire the coordinates of the original point clouds in the plane where the target image is located.

Specifically, the coordinates of the original point clouds in a depth sensor 121 coordinate system are first transformed into the coordinates of the original point clouds in an image acquisition device 122 coordinate system; and then the coordinates of the original point clouds in the image acquisition device 122 coordinate system are projected to the plane where the target image is located to acquire the coordinates of the original point clouds in the plane where the target image is located.

Optionally, in the embodiment of the present invention, the coordinates of the original point clouds in the image acquisition device 122 coordinate system satisfy:

$$\begin{pmatrix} x' \\ y' \\ z' \end{pmatrix} = T \times \begin{pmatrix} x \\ y \\ z \end{pmatrix}, \qquad (1)$$

wherein (x', y', z') are the coordinates of the original point clouds in the image acquisition device 122 coordinate system, (x, y, z) are the coordinates of the original point clouds in the depth sensor 121 coordinate system, and T is a transformation matrix from the depth sensor 121 coordinate system to the image acquisition device 122 coordinate system. Through the formula (1), the coordinates (x', y', z') of the original point clouds in the image acquisition device 122 coordinate system can be quickly acquired.

Since the depth sensor 121 and the image acquisition device 122 of the unmanned aerial vehicle 10 tend to rotate during motion, the transformation matrix of the two coordinate systems is often not directly available. In some embodiments, the transformation matrix T from the depth sensor 121 coordinate system to the image acquisition device 122 coordinate system can be derived from the transformation matrix $T_1$ from the depth sensor 121 coordinate system to an unmanned aerial vehicle 10 fuselage 12 coordinate system and the transformation matrix $T_2$ from the image acquisition device 122 coordinate system to the unmanned aerial vehicle 10 fuselage 12 coordinate system.

The transformation matrix T from the depth sensor 121 coordinate system to the image acquisition device 122 coordinate system satisfies:

$$T = T_2^T \times T_1 \qquad (2),$$

wherein $T_1$ is the transformation matrix from the depth sensor 121 coordinate system to the unmanned aerial vehicle 10 fuselage 12 coordinate system, and $T_2$ is the transformation matrix from the image acquisition device 122 coordinate system to the unmanned aerial vehicle 10 fuselage 12 coordinate system.

The transformation matrix T from the depth sensor 121 coordinate system to the image acquisition device 122 coordinate system can be rapidly acquired through the formula (2), (and then the coordinates (x', y', z') of the original point clouds in the image acquisition device 122 coordinate system can be rapidly calculated through the formula (1).

Optionally, the coordinates (u, v) of the original point clouds in the plane where the target image is located satisfy:

$$d \times \begin{pmatrix} u \\ v \end{pmatrix} = k \times \begin{pmatrix} x' \\ y' \\ z' \end{pmatrix} \text{ and} \qquad (3)$$

$$k = \begin{pmatrix} f_x & 0 & c_x \\ 0 & f_y & c_y \\ 0 & 0 & 1 \end{pmatrix}, \qquad (4)$$

wherein (x', y', z') are the coordinates of the original point clouds in the image acquisition device 122 coordinate system, d is the depth of the original point clouds, and k is an intrinsic matrix of the image acquisition device 122.

Therefore, after the coordinates (x', y', z') of the original point clouds in the image acquisition device 122 coordinate system are acquired, the coordinates (u, v) of the original point clouds in the plane where the target image is located can be quickly calculated according to the formulas (3) and (4).

Further, the visual chip 123 is further configured to determine the original point clouds of which the coordinates fall into the minimum bounding box in the original point clouds as the point clouds corresponding to the target.

Specifically, after all coordinates of the original point clouds in the plane where the target image is located are acquired through the above-mentioned method, the acquired coordinates of each original point cloud in the plane where the target image is located are compared with the minimum bounding box for judgment and then all original point clouds of which the coordinates fall into the minimum bounding box are determined. The original point clouds of which the coordinates in the plane where the target image is located fall into the minimum bonding box are the point clouds corresponding to the target.

Further, the visual chip 123 is further configured to filter the original point clouds of which the coordinates fall into the minimum bounding box so as to remove the point clouds which do not belong to the target.

Optionally, the original point clouds of which the coordinates fall into the minimum bounding box can be filtered by adopting a preset filtering method. The preset filtering method includes but is not limited to a Gaussian filtering method, a radius filtering method, a clustering method, a smoothing method, a connected domain method and the like.

The Gaussian filtering method is used as an example for explanation, the total number of the original point clouds of which the coordinates fall into the minimum bounding box is set to be n, the average distance $d_i$ between the ith original point cloud and m adjacent original point clouds closest to the ith original point cloud is calculated, $d_1$–$d_n$ can form Gaussian distribution, that is, $d_i$–$(\mu, \sigma)$, expected $\mu$ and variance $\sigma$ are calculated, and according to the property of Gaussian distribution, under the condition that $d_i > M*\sigma$, the original point cloud does not belong to the rectangular area and needs to be filtered out. M may be 2.0-3.0, and m is determined according to the resolution of the depth camera and the order of magnitude of the total original point clouds and generally may be a positive integer of 30-50.

In a similar way, the same effect can also be achieved by adopting the radius filtering method, the clustering method, the smoothing method, the connected domain method and the like.

Further, the visual chip 123 is further configured to do the following:

A three-dimensional map of the environment in front of the unmanned aerial vehicle 10 is established according to the original point clouds of the environment in front of the unmanned aerial vehicle 10.

Specifically, the original point clouds of the environment in front of the unmanned aerial vehicle 10 and the point clouds corresponding to the target acquired by the depth sensor 121 are transformed into a world coordinate system, and the original point clouds of the environment in front of the unmanned aerial vehicle 10 and the point clouds corresponding to the target acquired by the depth sensor 121 are combined and post-processed in the world coordinate system to acquire the three-dimensional map of the environment in front of the unmanned aerial vehicle 10.

Optionally, after all the original point clouds and the target point clouds acquired by the depth sensor 121 are combined in the world coordinate system, all the point clouds can be further post-processed by the methods of voxel filtering, octree or the like, and finally the three-dimensional map including the target is acquired. The three-dimensional map may be represented by an octree, a voxel, a grid map, a direct point cloud map, or the like, as long as it can represent a three-dimensional spatial relation, and the present invention is not specifically limited thereto. Of course, understandably, in some other embodiments, the map may be reduced in dimensionality to form a two-dimensional map in order to reduce the amount of calculation.

An average value of the three-dimensional coordinates of the point clouds corresponding to the target is calculated, wherein the average value is configured to represent the position of the target in the three-dimensional map.

The embodiments are only for describing the technical concepts and features of the present invention, and are intended to enable a person skilled in the art to understand the present invention and to practice the same, and are not intended to limit the scope of the present invention. Equivalent changes and modifications made in accordance with the claims of the present invention all remain within the scope of the claims of the present invention.

It should be understood that a person of ordinary skill in the art may make improvements or modifications according to the foregoing description, and all of the improvements and modifications should all fall within the protection scope of the attached claims of the present invention.

What is claimed is:

1. A target positioning method, applied to an unmanned aerial vehicle, the unmanned aerial vehicle comprising an image acquisition device and a depth sensor, and the method comprising:
    acquiring a target image through the image acquisition device;
    acquiring the position information of a target in the target image according to the target image;
    acquiring original point clouds of an environment in front of the unmanned aerial vehicle through the depth sensor;
    acquiring the point clouds corresponding to the target in the original point clouds according to the original point clouds and the position information of the target in the target image; and
    acquiring the position information of the target in a three-dimensional space according to the point clouds corresponding to the target;
    wherein the position information of the target in the target image comprises minimum bounding box coordinates of the target in the target image, and acquiring the point clouds corresponding to the target in the original point clouds according to the original point clouds and the position information of the target in the target image comprises:
    projecting the original point clouds to a plane where the target image is located to acquire the coordinates of the original point clouds in the plane where the target image is located; and
    determining the original point clouds of which the coordinates fall into a minimum bounding box in the original point clouds as the point clouds corresponding to the target.

2. The target positioning method according to claim 1, wherein projecting the original point clouds into the plane where the target image is located to acquire the coordinates of the original point clouds in the plane where the target image is located comprises:
    transforming the coordinates of the original point clouds in a depth sensor coordinate system into the coordinates of the original point clouds in an image acquisition device coordinate system; and
    projecting the coordinates of the original point clouds in the image acquisition device coordinate system to the plane where the target image is located to acquire the coordinates of the original point clouds in the plane where the target image is located.

3. The target positioning method according to claim 2, wherein the coordinates of the original point clouds in the image acquisition device coordinate system satisfy:

$$\begin{pmatrix} x' \\ y' \\ z' \end{pmatrix} = T \times \begin{pmatrix} x \\ y \\ z \end{pmatrix},$$

wherein (x', y', z') are the coordinates of the original point clouds in the image acquisition device coordinate system, (x, y, z) are the coordinates of the original point clouds in the depth sensor coordinate system, and T is a transformation matrix from the depth sensor coordinate system to the image acquisition device coordinate system.

4. The target positioning method according to claim 3, wherein the transformation matrix T from the depth sensor coordinate system to the image acquisition device coordinate system satisfies:

$$T = T_2^T \times T_1,$$

wherein $T_1$ is a transformation matrix from the depth sensor coordinate system to an unmanned aerial vehicle fuselage coordinate system, and $T_2$ is a transformation matrix from the image acquisition device coordinate system to the unmanned aerial vehicle fuselage coordinate system.

5. The target positioning method according to claim 1, wherein a coordinates (u, v) of the original point clouds in the plane where the target image is located satisfy:

$$d \times \begin{pmatrix} u \\ v \end{pmatrix} = k \times \begin{pmatrix} x' \\ y' \\ z' \end{pmatrix} \text{ and}$$

$$k = \begin{pmatrix} f_x & 0 & c_x \\ 0 & f_y & c_y \\ 0 & 0 & 1 \end{pmatrix} \text{ and}$$

wherein (x', y', z') are the coordinates of the original point clouds in the image acquisition device coordinate system, d is the depth of the original point clouds, and k is an intrinsic matrix of the image acquisition device.

6. The target positioning method according to claim 1, wherein before acquiring the point clouds corresponding to the target in the original point clouds according to the original point clouds and the position information of the target in the target image, the method further comprises:
    filtering the original point clouds of which the coordinates fall into the minimum bounding box so as to remove the point clouds which do not belong to the target.

7. The target positioning method according to claim 1, wherein acquiring the position information of the target in the three-dimensional space according to the point clouds corresponding to the target comprises:

establishing a three-dimensional map of the environment in front of the unmanned aerial vehicle according to the original point clouds of the environment in front of the unmanned aerial vehicle; and taking an average value of the three-dimensional coordinates of the point clouds corresponding to the target, wherein the average value is configured to represent the position of the target in the three-dimensional map.

8. The target positioning method according to claim 1, wherein the depth sensor comprises at least one of a binocular camera, a structured light camera, a time of flight (TOF) camera, and a laser radar.

9. A target positioning device, applied to an unmanned aerial vehicle, the unmanned aerial vehicle comprising an image acquisition device and a depth sensor, and the target positioning device comprising:

a processor configured to acquire a target image collected by an image acquisition device and acquire the position information of a target in the target image according to the target image;

acquire original point clouds of an environment in front of the unmanned aerial vehicle collected through the depth sensor;

acquire the point clouds corresponding to the target in the original point clouds according to the original point clouds and the position information of the target in the target image; and acquire the position information of the target in a three-dimensional space according to the point clouds corresponding to the target;

project the original point clouds to a plane where the target image is located to acquire the coordinates of the original point clouds in the plane where the target image is located; and determine the original point clouds of which the coordinates fall into a minimum bounding box in the original point clouds as the point clouds corresponding to the target.

10. The device according to claim 9, wherein the processor is further configured to transform the coordinates of the original point clouds in a depth sensor coordinate system into the coordinates of the original point clouds in an image acquisition device coordinate system; and project the coordinates of the original point clouds in the image acquisition device coordinate system to the plane where the target image is located to acquire the coordinates of the original point clouds in the plane where the target image is located.

11. The device according to claim 10, wherein the coordinates of the original point clouds in the image acquisition device coordinate system satisfy:

$$\begin{pmatrix} x' \\ y' \\ z' \end{pmatrix} = T \times \begin{pmatrix} x \\ y \\ z \end{pmatrix},$$

wherein (x', y', z') are the coordinates of the original point clouds in the image acquisition device coordinate system, (x, y, z) are the coordinates of the original point clouds in the depth sensor coordinate system, and T is a transformation matrix from the depth sensor coordinate system to the image acquisition device coordinate system.

12. The device according to claim 11, wherein the transformation matrix T from the depth sensor coordinate system to the image acquisition device coordinate system satisfies:

$$T = T_2^T \times T_1,$$

wherein $T_1$ is a transformation matrix from the depth sensor coordinate system to an unmanned aerial vehicle fuselage coordinate system, and $T_2$ is a transformation matrix from the image acquisition device coordinate system to the unmanned aerial vehicle fuselage coordinate system.

13. The device according to claim 9, wherein a coordinates (u, v) of the original point clouds in the plane where the target image is located satisfy:

$$d \times \begin{pmatrix} u \\ v \end{pmatrix} = k \times \begin{pmatrix} x' \\ y' \\ z' \end{pmatrix} \text{ and}$$

$$k = \begin{pmatrix} f_x & 0 & c_x \\ 0 & f_y & c_y \\ 0 & 0 & 1 \end{pmatrix},$$

wherein (x', y', z') are the coordinates of the original point clouds in the image acquisition device coordinate system, d is the depth of the original point clouds, and k is an intrinsic matrix of the image acquisition device.

14. The device according to claim 9, wherein the processor is further configured to filter the original point clouds of which the coordinates fall into the minimum bounding box so as to remove the point clouds which do not belong to the target.

15. The device according to claim 9, wherein the processor is further configured to establish a three-dimensional map of the environment in front of the unmanned aerial vehicle according to the original point clouds of the environment in front of the unmanned aerial vehicle; and take an average value of the three-dimensional coordinates of the point clouds corresponding to the target, wherein the average value is configured to represent the position of the target in the three-dimensional map.

16. The device according to claim 9, wherein the depth sensor comprises at least one of a binocular camera, a structured light camera, a time of flight (TOF) camera, and a laser radar.

17. A unmanned aerial vehicle, comprising a fuselage;

an arm, connected to the fuselage;

a power unit, arranged on the arm and configured to provide power required by the flight of the unmanned aerial vehicle;

a depth sensor, arranged on the fuselage and configured to acquire original point clouds of an environment in front of the unmanned aerial vehicle;

an image acquisition device, arranged on the fuselage and configured to acquire a target image and acquire the position information of a target in the target image according to the target image; and a visual chip, arranged on the fuselage, both the depth sensor and the image acquisition device being in communication connection with the visual chip, and the visual chip being configured to:
acquire the point clouds corresponding to the target in the original point clouds according to the original point clouds and the position information of the target in the target image; and
acquire the position information of the target in a three-dimensional space according to the point clouds corresponding to the target;
project the original point clouds to a plane where the target image is located to acquire the coordinates of the original point clouds in the plane where the target image is located; and
determine the original point clouds of which the coordinates fall into a minimum bounding box in the original point clouds as the point clouds corresponding to the target.

18. The unmanned aerial vehicle according to claim 17, wherein the visual chip is further configured to
transform the coordinates of the original point clouds in a depth sensor coordinate system into the coordinates of the original point clouds in an image acquisition device coordinate system; and
project the coordinates of the original point clouds in the image acquisition device coordinate system to the plane where the target image is located to acquire the coordinates of the original point clouds in the plane where the target image is located.

19. The unmanned aerial vehicle according to claim 18, wherein the coordinates of the original point clouds in the image acquisition device coordinate system satisfy:

$$\begin{pmatrix} x' \\ y' \\ z' \end{pmatrix} = T \times \begin{pmatrix} x \\ y \\ z \end{pmatrix},$$

wherein (x', y', z') are the coordinates of the original point clouds in the image acquisition device coordinate system, (x, y, z) are the coordinates of the original point clouds in the depth sensor coordinate system, and T is a transformation matrix from the depth sensor coordinate system to the image acquisition device coordinate system.

20. The unmanned aerial vehicle according to claim 19, wherein the transformation matrix T from the depth sensor coordinate system to the image acquisition device coordinate system satisfies:

$$T = T_2^T \times T_1,$$

wherein T1 is the transformation matrix from the depth sensor coordinate system to a fuselage coordinate system, and T2 is the transformation matrix from the image acquisition device coordinate system to the fuselage coordinate system.

21. The unmanned aerial vehicle according to claim 17, wherein a coordinates (u, v) of the original point clouds in the plane where the target image is located satisfy:

$$d \times \begin{pmatrix} u \\ v \end{pmatrix} = k \times \begin{pmatrix} x' \\ y' \\ z' \end{pmatrix} \text{ and}$$

$$k = \begin{pmatrix} f_x & 0 & c_x \\ 0 & f_y & c_y \\ 0 & 0 & 1 \end{pmatrix},$$

wherein (x', y', z') are the coordinates of the original point clouds in the image acquisition device coordinate system, d is the depth of the original point clouds, and k is an intrinsic matrix of the image acquisition device.

22. The unmanned aerial vehicle according to claim 17, wherein the visual chip is further configured to
filter the original point clouds of which the coordinates fall into the minimum bounding box so as to remove the point clouds which do not belong to the target.

23. The unmanned aerial vehicle according to claim 17, wherein the visual chip is further configured to
establish a three-dimensional map of the environment in front of the unmanned aerial vehicle according to the original point clouds of the environment in front of the unmanned aerial vehicle; and
take an average value of the three-dimensional coordinates of the point clouds corresponding to the target, wherein the average value is configured to represent the position of the target in the three-dimensional map.

24. The unmanned aerial vehicle according to claim 17, wherein the depth sensor comprises at least one of
a binocular camera, a structured light camera, a time of flight (TOF) camera, and a laser radar.

* * * * *